US012724197B2

(12) United States Patent
Yun et al.

(10) Patent No.: US 12,724,197 B2
(45) Date of Patent: Sep. 1, 2026

(54) THIN SILICON PHOTONICS WITH INTEGRATED III-V WAVEGUIDE

(71) Applicant: OpenLight Photonics, Inc., Goleta, CA (US)

(72) Inventors: Han Yun, Santa Clara, CA (US); Erik Johan Norberg, Santa Barbara, CA (US); John Parker, Goleta, CA (US)

(73) Assignee: OpenLight Photonics, Inc., Goleta, CA (US)

( * ) Notice: Subject to any disclaimer, the term of this patent is extended or adjusted under 35 U.S.C. 154(b) by 216 days.

(21) Appl. No.: 18/545,570

(22) Filed: Dec. 19, 2023

(65) Prior Publication Data

US 2024/0219637 A1 Jul. 4, 2024

Related U.S. Application Data

(60) Provisional application No. 63/436,402, filed on Dec. 30, 2022.

(51) Int. Cl.

*G02B 6/122* (2006.01)
*G02B 6/12* (2006.01)
*G02B 6/13* (2006.01)

(52) U.S. Cl.

CPC ............. *G02B 6/1228* (2013.01); *G02B 6/13* (2013.01); *G02B 2006/12097* (2013.01)

(58) Field of Classification Search

CPC .................... G02B 6/1228; G02B 2006/12097
See application file for complete search history.

(56) References Cited

U.S. PATENT DOCUMENTS

| | | | | |
|---|---|---|---|---|
| 6,253,009 | B1 | 6/2001 | Lestra et al. | |
| 6,253,015 | B1 * | 6/2001 | Ukrainczyk | G02B 6/1225 385/129 |
| 7,088,892 | B2 * | 8/2006 | Eldada | G02B 6/266 385/140 |
| 8,891,913 | B1 | 11/2014 | Roth et al. | |
| 9,431,791 | B1 * | 8/2016 | Norberg | H01S 5/50 |
| 11,163,115 | B1 | 11/2021 | Gehl et al. | |
| 11,409,040 | B1 * | 8/2022 | Bian | G02B 6/1228 |

(Continued)

FOREIGN PATENT DOCUMENTS

| | | |
|---|---|---|
| CN | 110785687 | 1/2022 |
| CN | 113885132 | 5/2022 |

(Continued)

OTHER PUBLICATIONS

"European Application Serial No. 23220802.5, Extended European Search Report mailed Jun. 7, 2024", 9 pgs.

(Continued)

*Primary Examiner* — Rhonda S Peace
(74) *Attorney, Agent, or Firm* — Schwegman Lundberg & Woessner, P.A.

(57) ABSTRACT

A device for thin-film silicon photonics with an integrated III-V waveguide structure includes a substrate containing a silicon layer and a III-V waveguide structure bonded to the substrate. The device also includes a waveguide transition structure, enabling light to be coupled between the silicon layer and the III-V waveguide structure. The waveguide transition structure may include a first section, a second section, and a third section, each section including one or more tapered segments.

20 Claims, 6 Drawing Sheets

(56) References Cited

U.S. PATENT DOCUMENTS

| | | | | |
|---|---|---|---|---|
| 11,631,967 | B2 * | 4/2023 | Koch | H01S 5/209 385/43 |
| 12,468,086 | B1 * | 11/2025 | Lin | G02B 6/12004 |
| 12,487,400 | B2 * | 12/2025 | Oka | G02B 6/305 |
| 2002/0159703 | A1 * | 10/2002 | McGreer | G02B 6/12004 385/39 |
| 2004/0202440 | A1 * | 10/2004 | Gothoskar | G02B 6/1228 385/129 |
| 2005/0244104 | A1 | 11/2005 | Payne | |
| 2013/0315537 | A1 | 11/2013 | Murao et al. | |
| 2018/0138658 | A1 | 5/2018 | Norberg et al. | |
| 2018/0231714 | A1 | 8/2018 | Collins | |
| 2019/0170944 | A1 | 6/2019 | Sodagar et al. | |
| 2019/0369333 | A1 | 12/2019 | Testa et al. | |
| 2019/0391336 | A1 * | 12/2019 | Wong | G02B 6/305 |
| 2020/0124791 | A1 | 4/2020 | Bayn et al. | |
| 2022/0013985 | A1 | 1/2022 | Koch et al. | |
| 2023/0104227 | A1 | 4/2023 | Bian | |
| 2023/0314708 | A1 | 10/2023 | Bian | |
| 2024/0061176 | A1 | 2/2024 | Bian | |
| 2024/0142700 | A1 | 5/2024 | Yun et al. | |
| 2024/0219637 | A1 * | 7/2024 | Yun | G02B 6/1228 |

FOREIGN PATENT DOCUMENTS

| | | | | |
|---|---|---|---|---|
| CN | 113568106 | | 7/2022 | |
| CN | 117991446 | | 5/2024 | |
| CN | 118276231 | | 7/2024 | |
| EP | 0729042 | B1 * | 12/2002 | G02B 6/305 |
| EP | 2985645 | | 2/2016 | |
| EP | 3091381 | | 11/2016 | |
| JP | 2016042575 | A | 3/2016 | |
| KR | 102861615 | B1 | 9/2025 | |
| TW | 1705275 | | 9/2020 | |
| TW | 1782350 | | 11/2022 | |
| TW | 202433105 | | 8/2024 | |
| TW | 202433108 | | 8/2024 | |
| TW | 1904535 | B | 11/2025 | |

OTHER PUBLICATIONS

"Taiwanese Application Serial No. 112142235, Office Action mailed Sep. 9, 2024", With English Machine Translation, 17 pgs.

"European Application Serial No. 23207503.6, Response filed Sep. 23, 2024 to Extended European Search Report mailed Mar. 12, 2024", 11 pgs.

"Taiwanese Application Serial No. 112151645, Office Action mailed Oct. 23, 2024", With English Machine Translation, 15 pgs.

"European Application Serial No. 23207503.6, Extended European Search Report mailed Mar. 12, 2024", 8 pgs.

De, Groote A, "Integration of a III-V light emitter on a silicon photonic IC through transfer printing", IEEE 13th International Conference on Group IV Photonics (GFP), IEEE, (Aug. 24, 2016), 2 pgs.

"U.S. Appl. No. 18/385,119, Examiner Interview Summary mailed Dec. 4, 2025", 2 pgs.

"U.S. Appl. No. 18/385,119, Non Final Office Action mailed Sep. 22, 2025", 9 pgs.

"U.S. Appl. No. 18/385,119, Notice of Allowance mailed Jan. 21, 2026", 8 pgs.

"U.S. Appl. No. 18/385,119, Response filed Dec. 3, 2025 to Non Final Office Action mailed Sep. 22, 2025", 9 pgs.

"European Application Serial No. 23207503.6, Communication Pursuant to Article 94(3) EPC mailed May 20, 2025", 6 pgs.

"European Application Serial No. 23207503.6, Response filed Sep. 17, 2025 to Communication Pursuant to Article 94(3) EPC mailed May 20, 2025", w/ English Claims, 12 pgs.

"Korean Application Serial No. 10-2023-0192556, Notice of Preliminary Rejection mailed May 30, 2025", w/ English translation, 7 pgs.

"Taiwanese Application Serial No. 112142235, Response filed Dec. 9, 2024 to Office Action mailed Sep. 9, 2024", w/ English claims, 13 pgs.

"Taiwanese Application Serial No. 112151645, Response filed Jan. 9, 2025 to Office Action mailed Oct. 23, 2024", w/English Claims, 27 pgs.

* cited by examiner

100
ANODE
128
CATHODE
130
III-V RIB
126
III-V SLAB
124
III-V N-TYPE LAYER
122
120
DIELECTRIC LAYER
132
SILICON LAYER
118
SUBSTRATE
134

THIN SILICON PHOTONICS WITH INTEGRATED III-V WAVEGUIDE

CROSS-REFERENCE TO RELATED APPLICATION

This application claims priority from U.S. Provisional Patent Application Ser. No. 63/436,402, filed Dec. 30, 2022, which is incorporated herein by reference in its entirety.

TECHNICAL FIELD

The present disclosure generally relates to optical devices and more particularly to optical waveguides.

BACKGROUND

Silicon photonics enables low-cost integrated optical circuits. Light can be coupled into such optical circuits from external light sources, but such external coupling generally results in optical coupling losses and degraded power efficiency. Hybrid silicon/III-V material platforms remedy these issues, facilitating integration of lasers, among other active devices, directly on-chip. Moreover, hybrid silicon/III-V optical circuits enable low-cost lasers to be added to existing photonics platforms. Hybrid silicon/III-V optical circuits generally include waveguide transition structures to couple light between silicon waveguide structures and III-V waveguide structures.

However, differences in refractive indices between silicon waveguide structures and III-V waveguide structures make coupling the two types of waveguides difficult. In wafers with silicon device layer thicknesses of around 500 nanometers (nm), efficient waveguide transitions can be formed from silicon width tapers. At the 500 nm thickness, the silicon width tapers enable varying the effective refractive index values of the silicon waveguide structure to be higher and/or lower than the refractive index of the III-V waveguide structure.

Yet, many foundries use wafers with silicon device layer thicknesses of only about 220 nm. The 220 nm thickness allows for higher-speed silicon optical modulators. However, such thin silicon layers result in a substantial refractive index mismatch between the silicon and III-V waveguide structures that cannot be overcome with conventional silicon tapers. Accordingly, to leverage the benefits of both hybrid silicon/III-V and thin-silicon photonic circuits, new waveguide transition structures are needed.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1A:
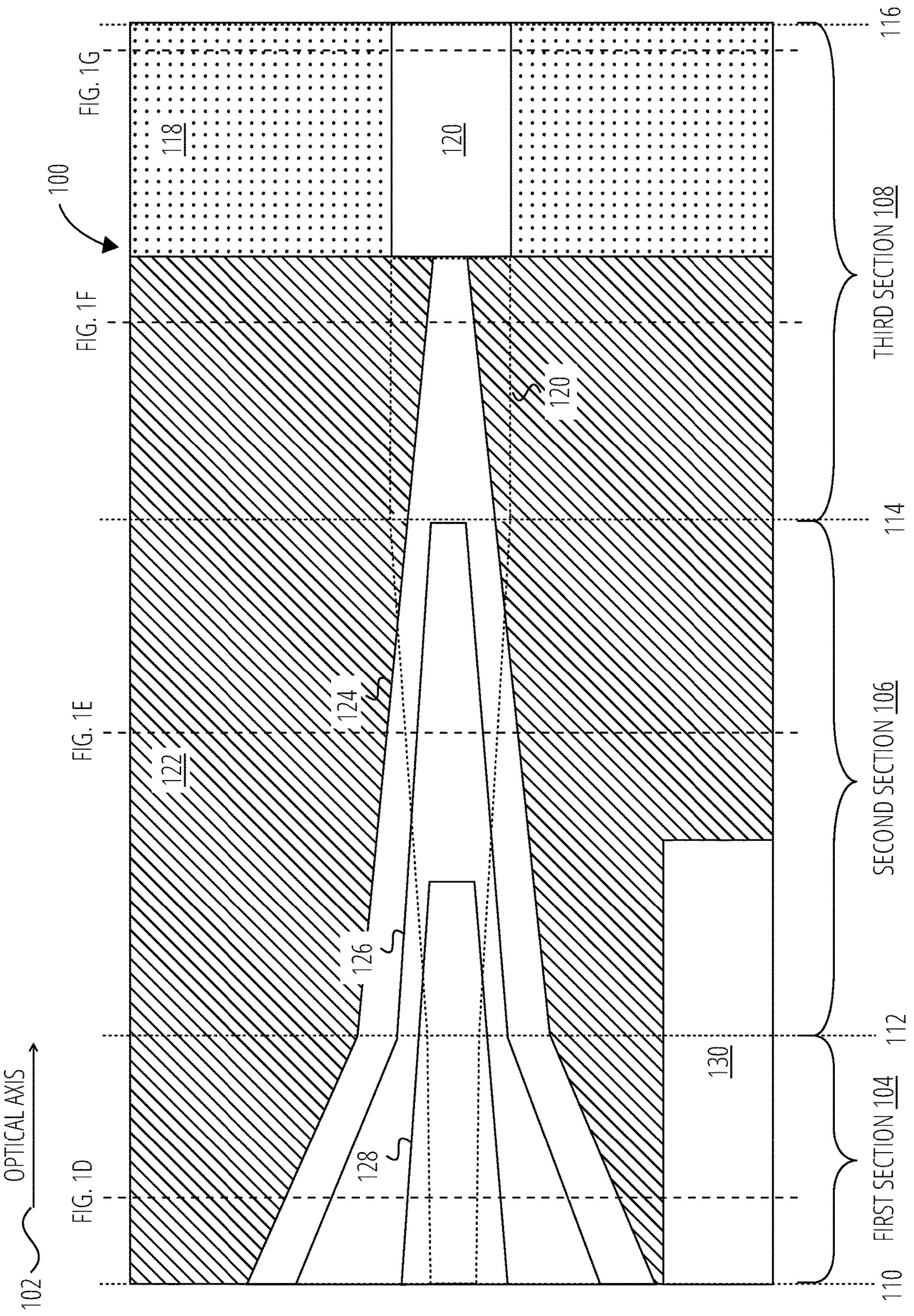
FIG. 1A illustrates a top view of an example waveguide transition structure, in accordance with some embodiments.

As described above, conventional manufacturing techniques may result in an optical refractive index mismatch between silicon waveguides and III-V waveguides that cannot be corrected by adjusting the width of the silicon waveguide. The mode effective index for light in a thin silicon waveguide of 220 nm in thickness is much smaller than that in the III-V waveguide. It is challenging to lower the effective index in III-V waveguide to match that in the silicon waveguide, and low loss transitions typically cannot be achieved using only silicon tapers.

Described herein are waveguide transition structures that achieve the optical coupling between a III-V compound semiconductor waveguide and a silicon waveguide structure within a thin-silicon photonic circuit. The waveguide transition structure may be subdivided, along the optical axis, into multiple adjacent sections. Light is coupled between the III-V waveguide structure and the silicon waveguide structure through multiple vertically layered waveguide transition segments that include tapers. The multiple waveguide transition segments each span one or more of the sections of the waveguide transition structure.

For example, the waveguide transition structure can be subdivided into three sections along the optical axis: a first section, a second section, and a third section. Further, the waveguide transition structure may contain three waveguide transition segments: a silicon transition segment, a III-V slab transition segment, and a III-V rib transition segment.

The silicon transition segment is formed in a silicon layer of the silicon waveguide structure, where the thin-silicon photonic circuit is implemented. The silicon transition segment spans the first, second, and third section of the waveguide transition structure. A top surface of the silicon layer is partially etched to form the silicon transition segment along the optical axis. The silicon transition segment has a constant width in the first section of the waveguide transition structure, width being perpendicular to the optical axis. The silicon transition segment increases in width to a larger width through the second section along the direction of the optical axis and has a constant width of the larger width in the third section.

The III-V slab transition segment of the waveguide transition structure is formed in the III-V waveguide structure, specifically in a slab layer of the III-V waveguide structure. The slab layer may be formed of optically active III-V material layers, such as intrinsic III-V material. The III-V slab transition segment overlaps at least part of the silicon transition segment and spans the first section, the second section, and at least part of the third section. Traversing along the optical axis, the III-V slab transition segment decreases in width in the first section, decreases in width in the second section, and decreases in width in the third section. The rate of decrease in width may vary in each respective section.

The III-V rib transition segment of the waveguide transition structure is formed in the III-V waveguide structure, specifically in a rib layer of the III-V waveguide structure. The III-V rib transition segment overlaps at least part of the III-V slab transition segment and spans at least the first section and the second section. Traversing along the optical axis, the III-V rib transition segment decreases in width in the first section, and decreases in width in the second section. The rate of decrease in width may vary in each respective section.

The III-V slab transition segment and III-V rib transition segment can be collectively referred to as the III-V transition segment. The III-V transition segment is formed to decrease the mode effective index in the III-V waveguide structure such that it approaches or matches the lower mode effective index of the silicon waveguide structure. The silicon transition segment is formed to increase the mode effective index of the silicon waveguide structure such that it approaches or matches the higher mode effective index of the III-V waveguide structure.

Beneficially, the waveguide transition structure achieves the requisite effective index match for transferring light from III-V to silicon while retaining the benefits of the thin silicon photonics for the photonic circuit in other regions. As a result, it is possible, for instance, to create thin silicon photonic circuits with high-speed p-n-junction-based silicon modulators and integrated III-V-based light sources.

Various example embodiments are now illustrated with reference to the accompanying drawings.

FIG. 1A illustrates a top view of an example waveguide transition structure 100, in accordance with some embodiments. The waveguide transition structure 100 is capable of connecting a silicon waveguide structure with a III-V waveguide structure. The waveguide transition structure 100 can be subdivided into three sections along the optical axis 102: a first section 104, a second section 106, and a third section 108. There is a first interface 110 separating the first section 104 from a first exterior edge of the waveguide transition structure. A second interface 112 separates the first section 104 and the second section 106. A third interface 114 separates the second section 106 and the third section 108. A fourth interface 116 separates the third section 108 from a second exterior edge of the waveguide transition structure 100.

The waveguide transition structure 100 has a silicon layer 118. The silicon layer 118 is partially etched on a top surface to form a silicon transition segment 120 that runs parallel to the optical axis 102. The silicon transition segment 120 may span the first section 104, the second section 106, and the third section 108. In the first section 104, the second section 106, and a portion of the third section 108, the silicon transition segment 120 extends underneath a III-V n-type layer 122, as indicated by the dotted lines. In a remaining portion of the third section 108, the upper surface of the silicon transition segment 120 is free of any III-V material layers above. The silicon layer 118, comprising the silicon transition segment 120, may have a thickness in the range from 150 nm to 350 nm, e.g., a standard thickness of 220 nm.

The III-V n-type layer 122 is disposed on top of and overlaps the silicon layer 118. The III-V n-type layer 122 spans at least the first section 104 and the second section 106. As depicted, the III-V n-type layer 122 may extend partially into the third section 108. The III-V n-type layer

122 is composed of an III-V n-type material. The III-V n-type layer 122 does not include any tapers, according to this embodiment.

A III-V slab transition segment 124 is disposed on top of and overlaps the III-V n-type layer 122. In some example the III-V slab transition segment 124 is formed along the optical axis 102 in the slab layer of the III-V waveguide structure by etching. The slab layer is composed of an optically active (e.g., intrinsic) III-V material. The III-V slab transition segment 124 spans the first section 104, the second section 106, and at least part of the third section 108.

A III-V rib transition segment 126 is disposed on top of and overlaps the III-V slab transition segment 124. The III-V rib transition segment 126 is formed along the optical axis 102 in the rib layer of the III-V waveguide structure by etching. The rib layer is composed of a III-V p-type material. The III-V rib transition segment 126 spans the first section 104 and the second section 106.

The waveguide transition structure 100 has two electrodes: an anode 128 and a cathode 130. The anode 128 is disposed on top of and overlaps the III-V rib transition segment 126. The cathode 130 is disposed on top of and overlaps the III-V n-type layer 122, adjacent to the III-V slab transition segment 124. The anode 128 and the cathode 130 may each span the first section 104 and at least part of the second section 106 as depicted. In other examples, the anode 128 and cathode 130 may span other section(s). According to some embodiments, the anode 128 tapers down through the first section 104 and at least part of the second section 106, as depicted.

The waveguide transition structure 100 features a number of tapers in the silicon transition segment 120, the III-V slab transition segment 124, and the III-V rib transition segment 126. The tapers are designed to alter the mode effective index of each respective material layer to bring the mode effective index of the III-V waveguide structure and that of the silicon waveguide structure closer together in value. Absent waveguide transition segments, the mode effective index of the silicon waveguide structure is much smaller than that of the III-V waveguide structure. The silicon transition segment 120 increases in width (tapers up) moving from the first section 104 towards the third section 108 to increase the mode effective index of the silicon transition segment 120 along the optical axis 102. The III-V slab transition segment 124 and the III-V rib transition segment 126 decrease in width (taper down) moving from the first section 104 towards the third section 108 to decrease the mode effective index of the III-V slab transition segment 124 and the III-V rib transition segment 126, respectively, along the optical axis 102.

Traversing along the optical axis 102 in the first section 104, the III-V slab transition segment 124 and the III-V rib transition segment 126 taper down. According to some embodiments, such as depicted in FIG. 1A, the angle of the taper (i.e., slope of decrease in width) is the same for the III-V slab transition segment 124 and the III-V rib transition segment 126 in the first section 104. The silicon transition segment 120 has a first constant width in the first section 104. According to some embodiments, the first constant width of the silicon transition segment 120 in the first section 104 is approximately 300 nanometers.

Traversing along the optical axis 102 in the second section, the silicon transition segment 120 increases in width. The silicon transition segment 120 increases from the first constant width at the second interface 112 to a larger width at the third interface 114. The III-V slab transition segment 124 and the III-V rib transition segment 126 taper down in the second section. The III-V rib transition segment 126 is tapered down to the minimum feature dimension supported by the process. The III-V rib transition segment 126 is finished off at the minimum feature dimension with a flat end or beveled end to minimize reflections (see FIG. 1B). According to some embodiments, such as depicted in FIG. 1A, the angle of the taper (i.e., slope of decrease in width) in the second section 106 is the same for the III-V slab transition segment 124 and the III-V rib transition segment 126.

The length of the taper in the second section 106 is a key design feature. In the second section 106, the optical mode is mainly confined to the III-V slab transition segment 124 (see FIG. 1E). An electrical contact may be added to inject current from the III-V slab transition segment 124 to the III-V rib transition segment 126. The electrical contact is placed as far down the taper of the III-V rib transition segment 126 as possible to minimize loss and prevent optical absorption, which occurs when the III-V material has no electrical current applied. If the taper in the second section 106 is too short, then the rapid change in refractive index profile will cause high loss. If the taper is too long, then the absorption from the III-V material will cause high loss. Accordingly, the location of the electrical contact and the length of the taper in the second section 106 are important features to optimize for low loss. In some examples, the length of the second section 106 comprising the tapers is approximately Y.

Traversing along the optical axis 102 in the third section 108, the silicon transition segment 120 has a second constant width. That is, from the third interface 114 to the fourth interface 116, the silicon transition segment 120 has the second constant width. According to some embodiments, the second constant width of the silicon transition segment 120 in the third section 108 is approximately 2 microns. The III-V slab transition segment 124 tapers down in the third section 108 as well. The III-V slab transition segment 124 tapers down to the minimum feature dimension supported by the process. The III-V slab transition segment 124 is finished off at the minimum feature dimension with a flat end or beveled end to minimize reflections.

Figure 1B:
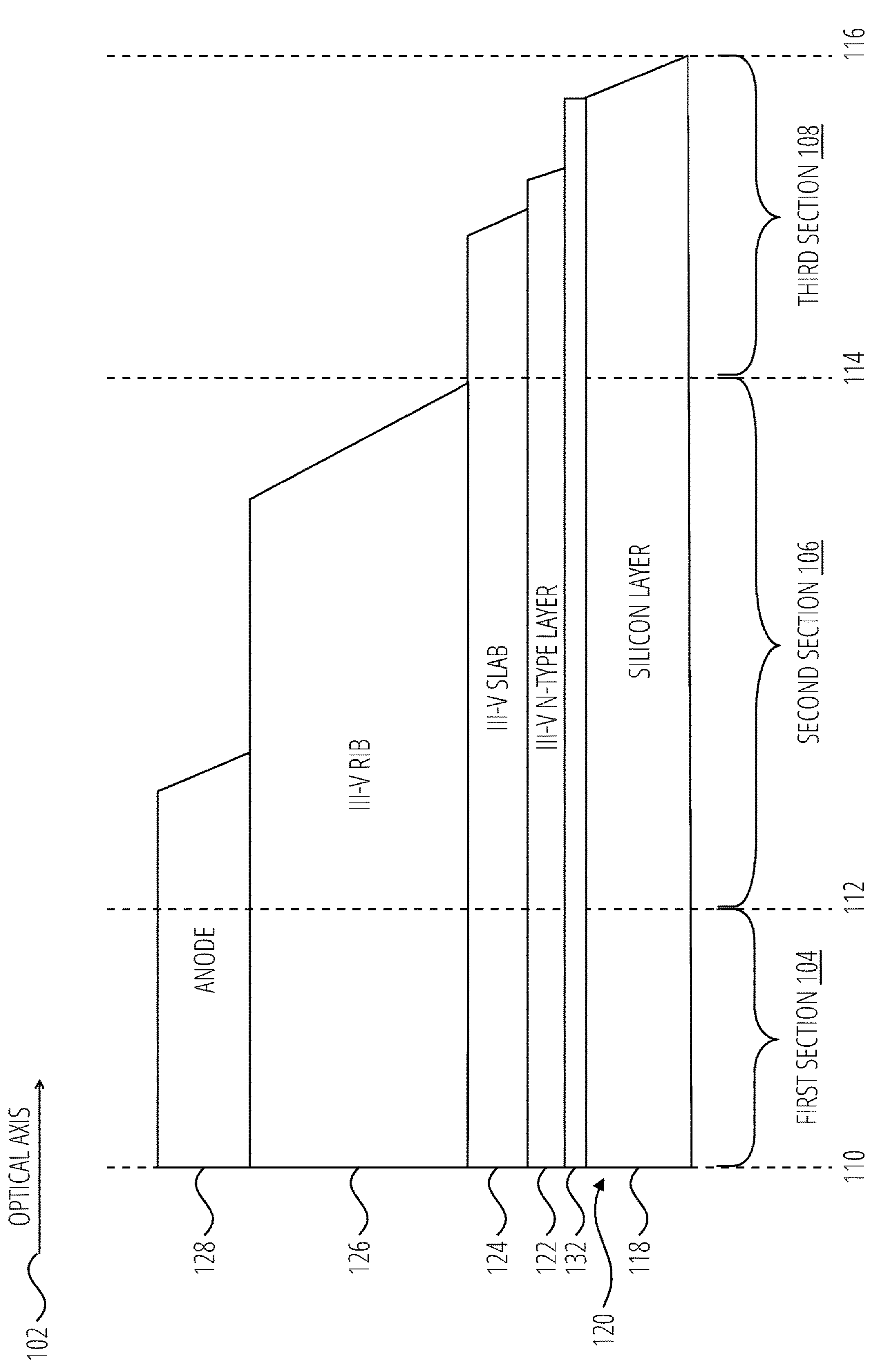
FIG. 1B illustrates a cross-sectional side-view of the example waveguide transition structure of FIG. 1A, in accordance with some embodiments.

FIG. 1B illustrates a cross-sectional side-view of the example waveguide transition structure 100, in accordance with some embodiments. The cross-sectional side-view provides an illustration of the layers of the waveguide transition structure 100 and their approximate relative thicknesses. The optical axis 102 and the first section 104, the second section 106, and the third section 108 are labeled for orientation purposes. The silicon layer 118, including the silicon transition segment 120 formed in the silicon layer 118, the III-V n-type layer 122, the III-V slab transition segment 124, the III-V rib transition segment 126, and the anode 128 are each depicted with a downward beveled end. The beveled end minimizes reflections within each respective layer.

According to some embodiments, waveguide transition structure 100 has a dielectric layer 132 between the silicon layer 118 (comprising the silicon transition segment 120) and the III-V n-type layer 122. The dielectric layer 132 may surround the silicon transition segment 120 on one or more sides, as better shown in FIG. 1C. The dielectric layer 132 is of a thickness greater than the feature thickness of the silicon transition segment 120, for example, approximately 100 nm in thickness. The dielectric layer 132 may be composed of any dielectric material, for example, silicon oxide ($SiO_2$), silicon nitride ($SiN_x$), or aluminum oxide ($Al_2O_3$).

Figure 1C:
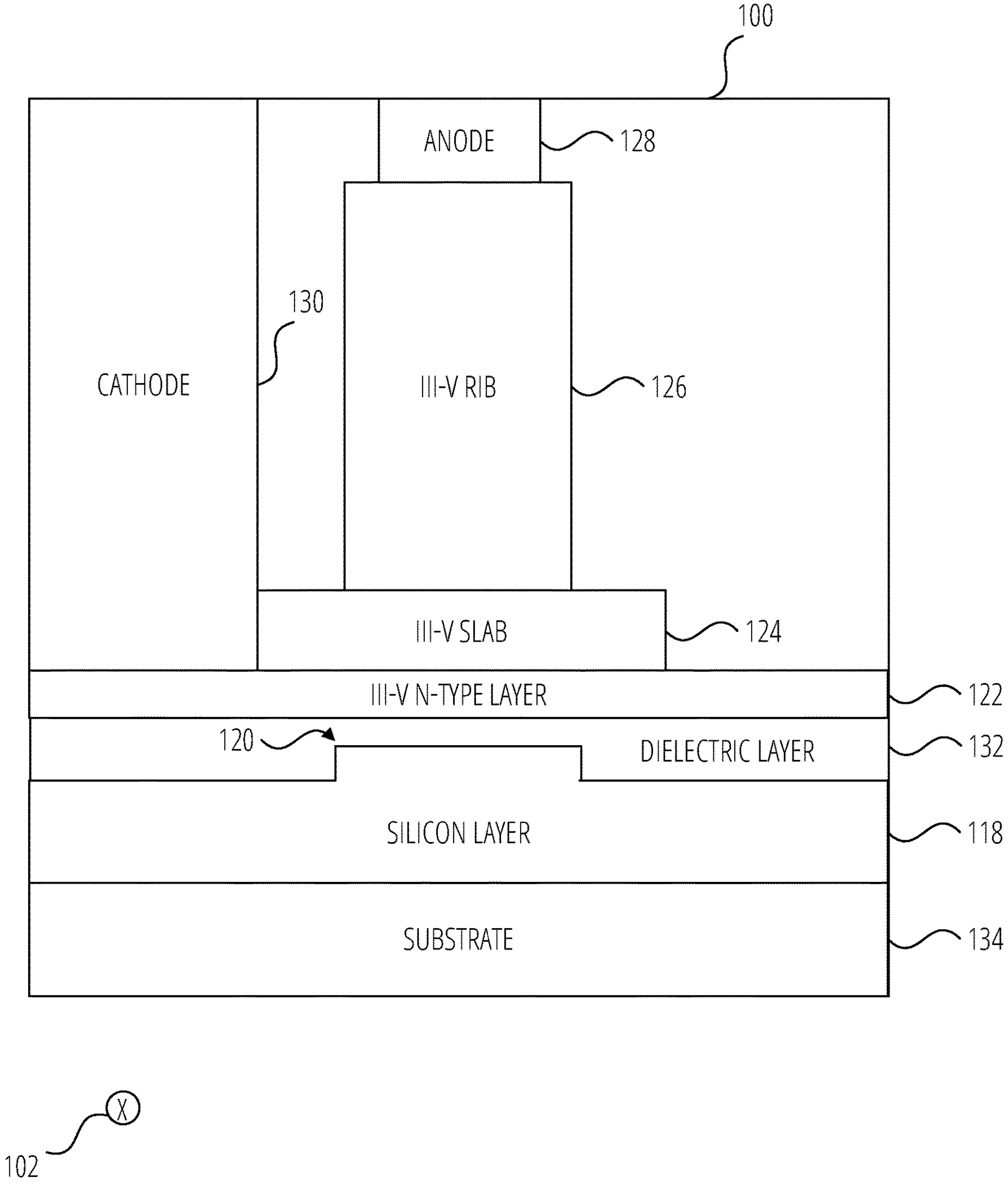
FIG. 1C illustrates an overall frontal view of the example waveguide transition structure of FIG. 1A, in accordance with some embodiments.

FIG. 1C illustrates a frontal view of the example waveguide transition structure 100, in accordance with some embodiments. The frontal view provides an overall illustration of the waveguide transition structure 100 with the optical axis 102 oriented into the sheet. FIG. 1C shows another view of previously discussed parts: the silicon layer 118 with the silicon transition segment 120, the dielectric layer 132, the III-V n-type layer 122, the III-V slab transition segment 124, the III-V rib transition segment 126, the anode 128, and the cathode 130. The waveguide transition structure 100 of FIG. 1B also depicts an optional substrate 134.

The substrate 134 is an optional base of the waveguide transition structure 100, with the silicon layer 118 formed on top of the substrate 134. The substrate 134 may be any conventional substrate material. The substrate 134 may contain additional layers or sub-components not depicted here. For example, the substrate 134 may comprise a relatively thin oxide layer (e.g., a buried oxide layer) and a silicon layer (e.g., silicon handle). The silicon layer of the substrate 134 may, for example, have a thickness in the range from 150 nm to 350 nm, e.g., a standard thickness of 220 nm.

Figure 1D:
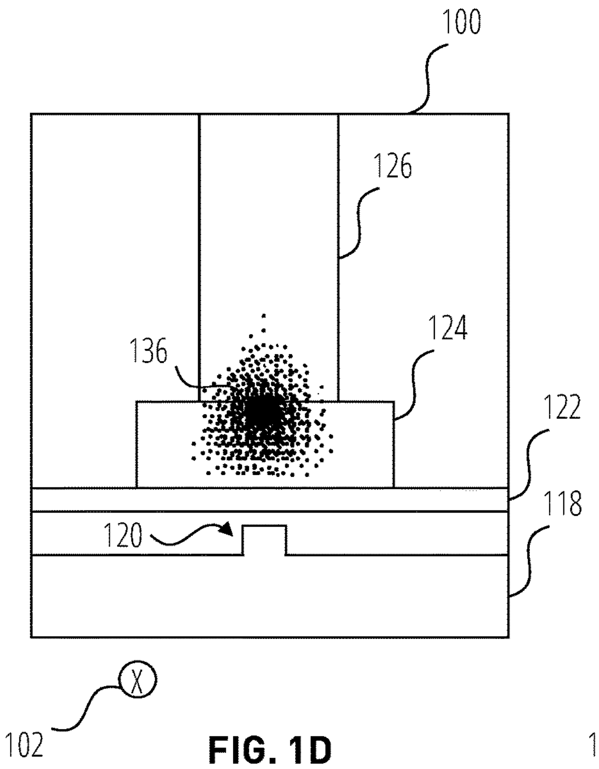
FIG. 1D illustrates a cross-sectional view of the example waveguide transition structure of FIG. 1A at a first cross section, in accordance with some embodiments.

FIG. 1D illustrates a cross-sectional view of an example waveguide transition structure 100 with an optical mode 136 at a first cross-section, in accordance with some embodiments. Note that FIG. 1D to FIG. 1G show simplified cross-sectional views of the waveguide transition structure 100, without the anode 128, cathode 130, or optional features, for clarity.

The first cross-section depicted in FIG. 1D is in the first section 104, as marked in FIG. 1A. The first cross section shows the silicon transition segment 120 at its smaller constant width in the first section. Additionally, the first cross-section shows the III-V slab transition segment 124 and the III-V rib transition segment 126 at their near-widest end in the first section 104.

The optical mode 136 in the first section 104 is within the III-V material structures, mostly within the III-V slab transition segment 124 and partially within the III-V rib transition segment 126.

Figure 1E:
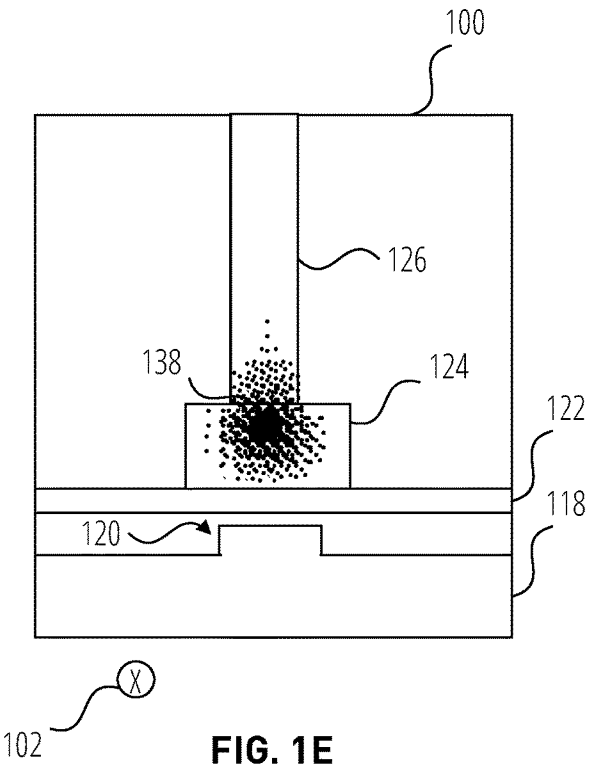
FIG. 1E illustrates a cross-sectional view of the example waveguide transition structure of FIG. 1A at a second cross section, in accordance with some embodiments.

FIG. 1E illustrates a cross-sectional view of an example waveguide transition structure 100 at a second cross-section with an optical mode 138, in accordance with some embodiments. The second cross section is in the second section 106, as marked in FIG. 1A. The second cross-section shows mid-upward taper of the silicon transition segment 120. The width of the silicon transition segment 120 is greater in FIG. 1E as compared to FIG. 1D. The second cross section shows the III-V slab transition segment 124 and the III-V rib transition segment 126 in the middle of their second downward taper. The width of the III-V slab transition segment 124 and the width of the III-V rib transition segment 126 are each smaller in FIG. 1E than in FIG. 1D.

The optical mode 138 in the second section 106 is primarily within the III-V material structures, mostly within the III-V slab transition segment 124 and partially within the III-V rib transition segment 126. From the first section 104 into the second section 106, the optical mode 138 has moved closer to the silicon layer 118.

Figure 1F:
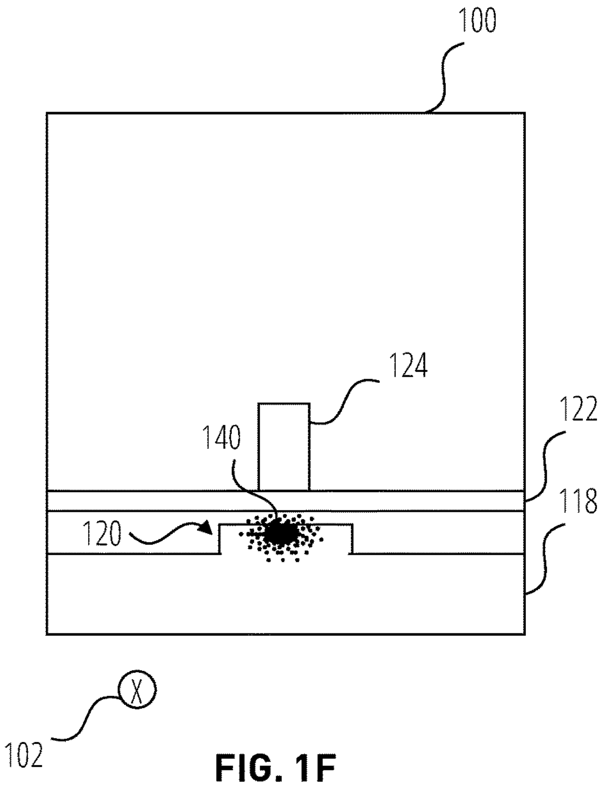
FIG. 1F illustrates a cross-sectional view of the example waveguide transition structure of FIG. 1A at a third cross section, in accordance with some embodiments.

FIG. 1F illustrates a cross-sectional view of an example waveguide transition structure 100 at a third cross section with an optical mode 140, in accordance with some embodiments. The third cross section is in the third section 108, before the III-V n-type layer 122 ends, as marked in FIG. 1A. The III-V slab transition segment 124 is nearing its minimum feature width in the third cross section. The silicon transition segment 120 is at its larger constant width and is wider in FIG. 1F than in both FIG. 1D and FIG. 1E.

By the end of the second section 106, the optical mode 140 has mostly transitioned into the silicon transition segment 120. The optical mode 140 is primarily though not entirely within the silicon transition segment 120.

Figure 1G:
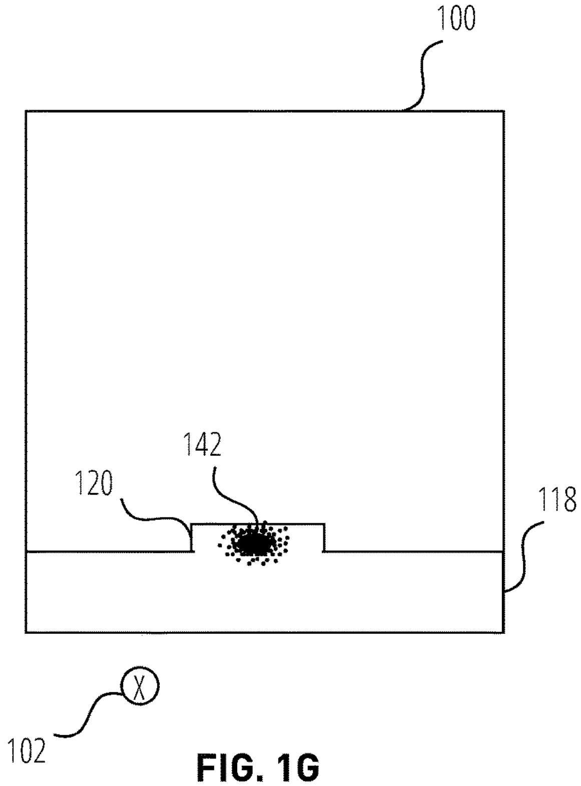
FIG. 1G illustrates a cross-sectional view of the example waveguide transition structure at a fourth cross section, in accordance with some embodiments.

FIG. 1G illustrates a cross-sectional view of an example waveguide transition structure 100 at a fourth cross section with an optical mode 142, in accordance with some embodiments. The fourth cross section is in the third section 108, after the end of the III-V n-type layer, as marked in FIG. 1A. As depicted, the top surface of the silicon layer 118 (including the silicon transition segment 120) is free. The silicon transition segment 120 is at its larger constant width, having the same width as in FIG. 1F. By the end of the third section 108, the optical mode 142 is entirely within the silicon transition segment 120 of the silicon layer 118.

Figure 2A:
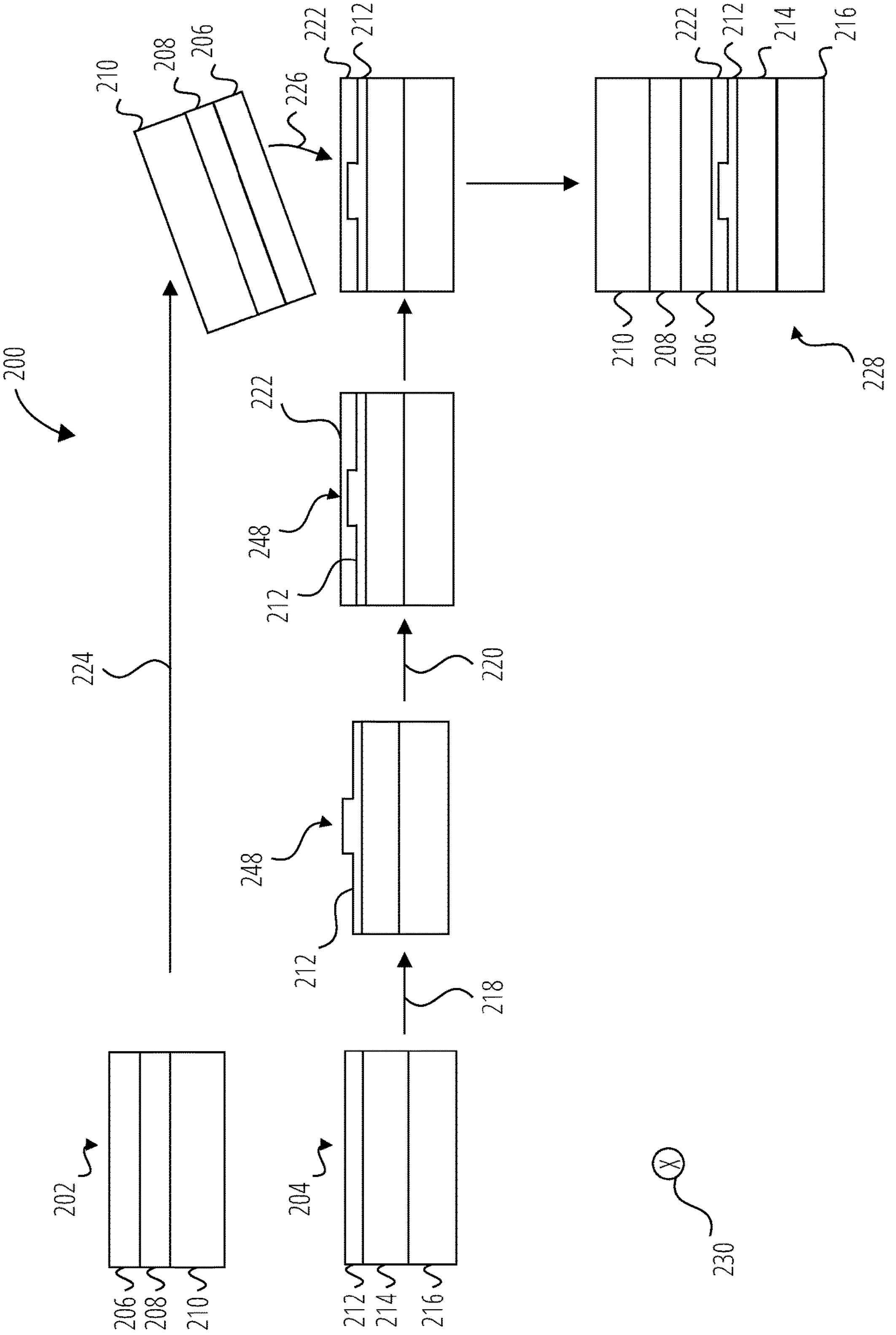
FIG. 2A illustrates a sequence of steps in a manufacturing process, in accordance with some embodiments.

FIG. 2A illustrates a sequence of steps in a manufacturing process 200 to create the waveguide transition structure 100, in accordance with some embodiments. The process 2000 may have additional or fewer steps than described herein. The process 200 begins with a III-V structure 202 and a silicon structure 204.

The III-V structure 202 comprises a III-V n-type layer 206, a III-V active layer 208, and a III-V p-type layer 210. The III-V n-type layer 206 can comprise an example of the III-V n-type layer 122. The III-V active layer 208 can also be referred to as a slab layer. The III-V p-type layer 210 can also be referred to as a rib layer. The III-V waveguide structure may be composed of any III-V materials and doped accordingly.

The silicon structure 204 comprises a silicon layer 212, a buried oxide layer 214, and a silicon handle 216. A thin-silicon photonic circuit may be implemented in the silicon layer 212 (e.g., contemporaneously with the creation of the silicon transition segment). Additionally, or alternatively, a doped p-n junction may be formed within the silicon layer 212 to form an optical modulator. The buried oxide layer 214 and the silicon handle 216 are two substrate layers and may together comprise an example of the substrate 134 of FIG. 1B.

At step 218 of the process 200, the silicon layer 212 of the silicon structure 204 is patterned, for example with one or more masks, and partially etched to create a silicon transition segment 248 with taper(s). The silicon transition segment 248 can comprise an example of the silicon transition segment 120. The silicon layer 212 is partially etched, leaving behind the etched-out silicon transition segment 248 as well as the remaining of the silicon layer 212 with the thin-silicon photonic circuit.

At step 220 of the process 200, a dielectric layer 222 is deposited and planarized. The dielectric layer 222 can be the dielectric layer 132. The methods of deposition and planarization used may vary based on the dielectric material being used in the dielectric layer 222. For example, the step 220 can involve chemical vapor deposition (CVD), atomic layer deposition (ALD), electrochemical deposition (ECD), and/or any other method of deposition. The planarization may involve chemical-mechanical polishing (CMP) with slurry with any type of abrasive additives, or any other method of planarization or polishing.

At step 224 of the process 200, the III-V structure 202 is inverted. That is, after inverting, the III-V n-type layer 206 is on the bottom, the III-V active layer 208 is in the middle, and the III-V p-type layer 210 is on top, with its top surface free.

At step 226 of the process 200, the III-V structure 202 is bonded to the silicon structure 204. In particular, the III-V n-type layer 206 of the III-V structure 202 is bonded to the dielectric layer 222 of the silicon structure 204, according to the depicted embodiment. In embodiments without a dielectric layer 222, the III-V n-type layer 206 is bonded to the silicon layer 212. Step 226 generates a bonded structure 228. The bonded structure 228 includes both the III-V structure 202 and the silicon structure 204 bonded together. The process 200 continues in FIG. 2B with the bonded structure 228.

Figure 2B:
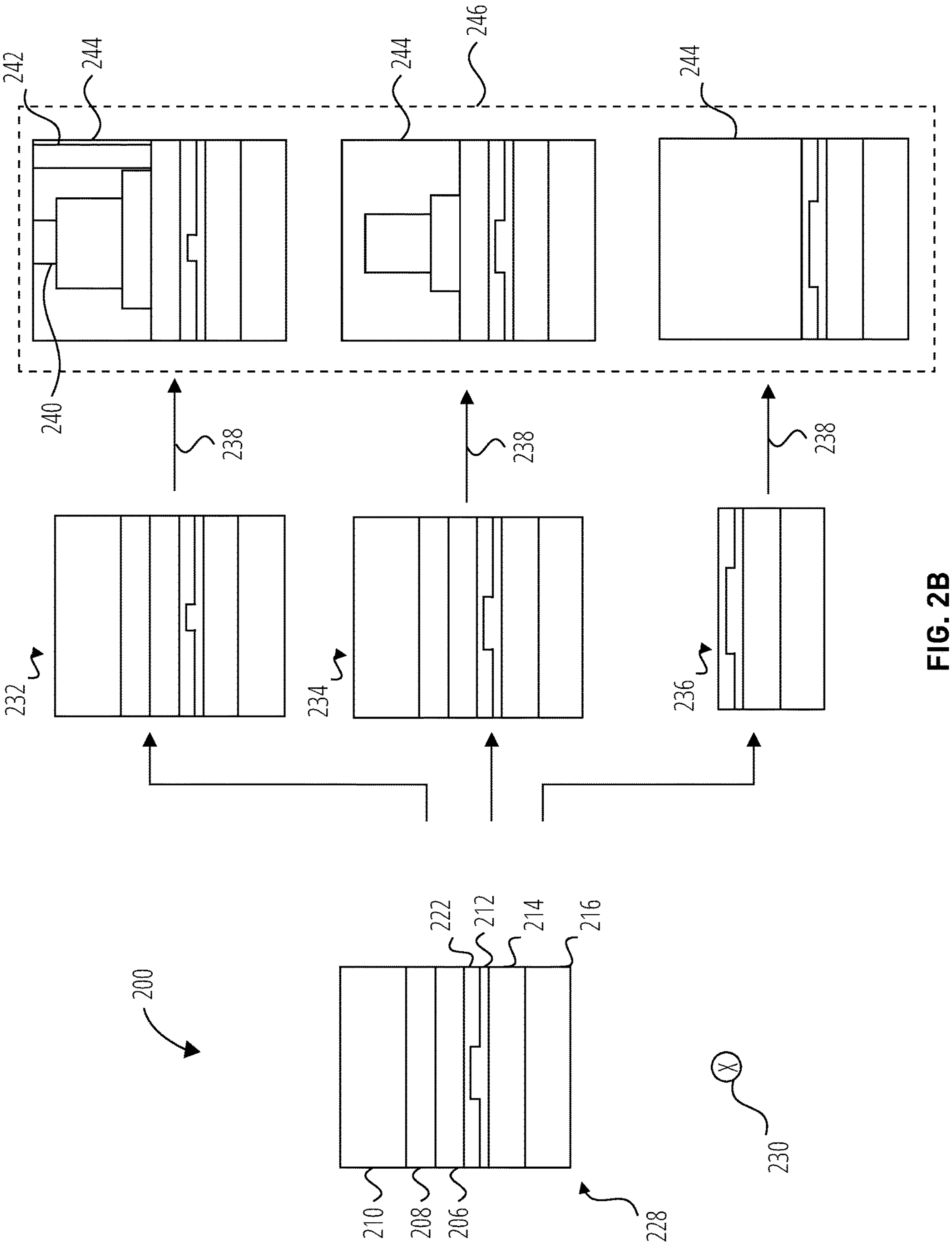
FIG. 2B illustrates a sequence of steps in a manufacturing process, in accordance with some embodiments.

FIG. 2B illustrates a sequence of steps in a manufacturing process 200, in accordance with some embodiments. The bonded structure 228 contains three sections along an optical axis 230 extending into the sheet: a first section, a second section, and a third section, which may comprise examples of the first section 104, the second section 106, and the third section 108, respectively. FIG. 2B depicts example cross-sectional views of the bonded structure 228 within each of the three sections: a first section cross-section 232, a second section cross-section 234, and a third section cross-section 236. As depicted, the etched out silicon transition segment 248 in the silicon layer 212 increases in width in each successive cross section. Similarly, the silicon layer 212 is free of the III-V structure 202 in the depicted third section cross-section 236.

At step 238 of the process 200, the III-V active layer 208 and the III-V p-type layer 210 are etched and electrodes are added. The etching of the III-V active layer 208 forms a III-V slab transition segment, such as the III-V slab transition segment 124. The etching of the III-V p-type layer 210 forms a III-V rib transition segment, such as the III-V rib transition segment 126. The electrodes added include an anode 240 (e.g., anode 128) and a cathode 242 (e.g., cathode 130). While the anode 240 and cathode 242 are depicted in the first section in FIG. 2B, they may extend into other sections as well.

Optionally at step 238 of the process 200, the etched-away material is filled in with a dielectric 244. This dielectric 244 may be the same as or a different material than the dielectric layer 222.

The resultant three sections from step 238 form a waveguide transition structure 246. The waveguide transition structure 246 can comprise an example of the waveguide transition structure 100. The waveguide transition segments bring down differences in refractive indices between the III-V structure 202 and the silicon structure 204. The waveguide transition structure 246 enables coupling a thin-silicon optic circuit with a III-V structure that includes a low-cost laser light source, thereby enabling faster electronics at a lower cost.

Reference throughout this specification to "one embodiment" or an "embodiment" or "some embodiments" or the like means that a particular feature, structure, or characteristic described is included in one or more embodiments of the claimed subject matter, but the appearances of "embodiment" or "embodiments" in various places throughout this specification are not necessarily all referring to the same embodiment(s). Furthermore, the particular features, structures, or characteristics may be combined in one or more embodiments.

Various modifications and changes may be made to the above-described embodiments without departing from the broader scope of the inventive subject matter. Accordingly, the specification and drawings are to be regarded in an illustrative rather than a restrictive sense. Examples described herein may provide devices having waveguide transition structures that achieve the optical coupling between a III-V compound semiconductor waveguide and a silicon waveguide of a thin-silicon photonic circuit, and methods of manufacture thereof.

In view of the disclosure above, various examples are set forth below. It should be noted that one or more features of an example, taken in isolation or combination, should be considered within the disclosure of this application.

Example 1 is a device comprising: a substrate comprising a silicon layer; a III-V structure bonded to the substrate; and formed in the silicon layer and the III-V structure, a waveguide transition structure comprising first, second, and third sections along an optical axis, the waveguide transition structure comprising a III-V slab transition segment formed in the III-V structure and extending across the first and second sections and into the third section, wherein: the III-V slab transition segment decreases in width from a first width at an interface between a first exterior edge of the device and the first section to a second width at an interface between the first section and the second section, the III-V slab transition segment decreases in width from the second width at the interface between the first section and the second section to a third width at an interface between the second section and the third section, and the III-V slab transition segment decreases in width from the third width at the interface between the second section and the third section to a fourth width at an interface between the third section and a second exterior edge of the device.

In Example 2, the subject matter of Example 1 includes, wherein the III-V slab transition segment is formed in a slab layer of the III-V structure, the slab layer comprising an optically active III-V material.

In Example 3, the subject matter of Examples 1-2 includes, wherein the waveguide transition structure further comprises a III-V rib transition segment formed in the III-V structure and extending across the first and second sections, wherein: the III-V rib transition segment decreases in width from a fifth width at the interface of the first exterior edge of the device and the first section and to a sixth width at the interface of the first section and the second section; and the III-V rib transition segment decreases in width from the sixth width at the interface between the first section and the second section to a seventh width at the interface between the second section and the third section.

In Example 4, the subject matter of Example 3 includes, wherein the III-V rib transition segment is formed in a rib layer of the III-V structure, the rib layer comprising a p-type III-V material.

In Example 5, the subject matter of Examples 1~4 includes, wherein the waveguide transition structure further comprises a silicon transition segment formed in the silicon layer and extending across the first, second, and third sections, wherein: the silicon transition segment has a constant width of an eighth width within the first section; the silicon transition segment increases in width from the eighth width at the interface between the first and second sections to a ninth width at the interface between the second and third sections; and the silicon transition segment has a constant width of the ninth width within the third section, the eight width being less than the ninth width.

In Example 6, the subject matter of Example 5 includes, wherein the eighth width is 300 nanometers.

In Example 7, the subject matter of Examples 1-6 includes, an anode, the anode overlapping the III-V slab transition segment in at least the first section; and a cathode adjacent to the III-V slab transition segment.

In Example 8, the subject matter of Examples 1-7 includes, a dielectric layer separating the III-V structure from the silicon layer.

In Example 9, the subject matter of Example 8 includes, wherein the III-V structure comprises a n-type layer, the n-type layer being between the III-V slab transition segment and the dielectric layer.

In Example 10, the subject matter of Examples 8-9 includes, wherein the dielectric layer is formed of silicon oxide ($SiO_2$), silicon nitride ($SiN_x$), or aluminum oxide ($Al_2O_3$).

In Example 11, the subject matter of Examples 1-10 includes, wherein at least a portion of the third section is free of the III-V structure.

In Example 12, the subject matter of Examples 1-11 includes, wherein the silicon layer has a thickness between 150 nanometers and 350 nanometers.

Example 13 is a method of manufacturing a photonic device, the method comprising: providing a substrate comprising a silicon layer; patterning the silicon layer to form a silicon waveguide transition segment; forming a top dielectric layer above the silicon layer; bonding a III-V semiconductor structure to the top dielectric layer; and patterning the III-V semiconductor structure to form a III-V waveguide transition structure overlapping the silicon waveguide transition segment, the III-V waveguide transition structure comprising a first section, second section, and third section arranged sequentially along an optical axis of the photonic device, the III-V waveguide transition structure comprising a III-V slab transition segment extending across the first and second sections and into the third section, wherein: the III-V slab transition segment decreases in width from a first width at an interface between a first exterior edge of the device and the first section to a second width at an interface between the first section and the second section, the III-V slab transition segment decreases in width from the second width at the interface between the first section and the second section to a third width at an interface between the second section and the third section, and the III-V slab transition segment decreases in width from the third width at the interface between the second section and the third section to a fourth width at an interface between the third section and a second exterior edge of the device.

In Example 14, the subject matter of Example 13 includes, wherein the III-V slab transition segment is formed in a slab layer of the III-V semiconductor structure, the slab layer comprising an optically active III-V material.

In Example 15, the subject matter of Examples 13-14 includes, wherein the III-V waveguide transition structure further comprises a III-V rib transition segment extending across the first and second sections, wherein: the III-V rib transition segment decreases in width from a fifth width at the interface of the first exterior edge of the device and the first section and to a sixth width at the interface of the first section and the second section; and the III-V rib transition segment decreases in width from the sixth width at the interface between the first section and the second section to a seventh width at the interface between the second section and the third section.

In Example 16, the subject matter of Example 15 includes, wherein the III-V rib transition segment is formed in a rib layer of the III-V semiconductor structure, the rib layer comprising a p-type III-V material.

In Example 17, the subject matter of Examples 13-16 includes, wherein the silicon transition segment formed in the silicon layer extends across the first, second, and third sections, wherein: the silicon transition segment has a constant width of an eighth width within the first section; the silicon transition segment increases in width from the eighth width at the interface between the first and second sections to a ninth width at the interface between the second and third sections; and the silicon transition segment has a constant width of the ninth width within the third section, the eight width being less than the ninth width.

In Example 18, the subject matter of Examples 13-17 includes, patterning the silicon layer to form a silicon waveguide transition segment, the silicon waveguide transition segment having a first constant width within the first section, the silicon waveguide transition segment increasing in width in the second section, and having a second constant width in the third section, the first constant width being smaller than the second constant width.

In Example 19, the subject matter of Examples 13-18 includes, forming an anode, the anode overlapping the III-V slab transition segment in at least the first section; and forming a cathode adjacent to the III-V slab transition segment.

In Example 20, the subject matter of Examples 13-19 includes, wherein the silicon layer has a thickness between 150 nanometers and 350 nanometers.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20. Example 23 is a system to implement of any of Examples 1-20.

Example 24 is a method to implement of any of Examples 1-20.

What is claimed is:

1. A device comprising:
- a substrate comprising a silicon layer;
- a III-V structure bonded to the substrate; and
- formed in the silicon layer and the III-V structure, a waveguide transition structure comprising first, second, and third sections along an optical axis, the waveguide transition structure comprising:
  - a silicon transition segment formed in the silicon layer and extending across the first, second, and third sections, wherein the silicon transition segment increases in width from an eighth width at the interface between the first and second sections to a ninth width at the interface between the second and third sections, the eight width being less than the ninth width; and
  - a III-V slab transition segment formed in the III-V structure and extending across the first and second sections and into the third section, wherein:
    - the III-V slab transition segment decreases in width from a first width at an interface between a first exterior edge of the device and the first section to a second width at an interface between the first section and the second section;
    - the III-V slab transition segment decreases in width from the second width at the interface between the first section and the second section to a third width at an interface between the second section and the third section; and
    - the III-V slab transition segment decreases in width from the third width at the interface between the second section and the third section to a fourth width at an interface between the third section and a second exterior edge of the device.

2. The device of claim 1, wherein the III-V slab transition segment is formed in a slab layer of the III-V structure, the slab layer comprising an optically active III-V material.

3. The device of claim 1, wherein the waveguide transition structure further comprises a III-V rib transition segment formed in the III-V structure and extending across the first and second sections, wherein:
- the III-V rib transition segment decreases in width from a fifth width at the interface of the first exterior edge of the device and the first section and to a sixth width at the interface of the first section and the second section; and
- the III-V rib transition segment decreases in width from the sixth width at the interface between the first section and the second section to a seventh width at the interface between the second section and the third section.

4. The device of claim 3, wherein the III-V rib transition segment is formed in a rib layer of the III-V structure, the rib layer comprising a p-type III-V material.

5. The device of claim 1, wherein the waveguide transition structure further comprises a silicon transition segment formed in the silicon layer and extending across the first, second, and third sections, wherein:
- the silicon transition segment has a constant width of the eighth width within the first section;
- and
- the silicon transition segment has a constant width of the ninth width within the third section.

6. The device of claim 1, further comprising:
- an anode, the anode overlapping the III-V slab transition segment in at least the first section; and
- a cathode adjacent to the III-V slab transition segment.

7. The device of claim 1, further comprising:
- a dielectric layer separating the III-V structure from the silicon layer.

8. The device of claim 7, wherein the III-V structure comprises a n-type layer, the n-type layer being between the III-V slab transition segment and the dielectric layer.

9. The device of claim 8, wherein the dielectric layer is formed of silicon oxide ($SiO_2$), silicon nitride ($SiN_x$), or aluminum oxide ($Al_2O_3$).

10. The device of claim 1, wherein at least a portion of the third section is free of the III-V structure.

11. The device of claim 1, wherein the silicon layer has a thickness between 150 nanometers and 350 nanometers.

12. A method of manufacturing a photonic device, the method comprising:
- providing a substrate comprising a silicon layer;
- patterning the silicon layer to form a silicon waveguide transition segment extending across the first, second, and third sections, wherein the silicon transition segment increases in width from an eighth width at the interface between the first and second sections to a ninth width at the interface between the second and third sections, the eight width being less than the ninth width;
- forming a top dielectric layer above the silicon layer;
- bonding a III-V semiconductor structure to the top dielectric layer; and
- patterning the III-V semiconductor structure to form a III-V waveguide transition structure overlapping the silicon waveguide transition segment, the III-V waveguide transition structure comprising a first section, second section, and third section arranged sequentially along an optical axis of the photonic device, the III-V waveguide transition structure comprising a III-V slab transition segment extending across the first and second sections and into the third section, wherein:

the III-V slab transition segment decreases in width from a first width at an interface between a first exterior edge of the device and the first section to a second width at an interface between the first section and the second section;

the III-V slab transition segment decreases in width from the second width at the interface between the first section and the second section to a third width at an interface between the second section and the third section; and the III-V slab transition segment decreases in width from the third width at the interface between the second section and the third section to a fourth width at an interface between the third section and a second exterior edge of the device.

13. The method of claim 12, wherein the III-V slab transition segment is formed in a slab layer of the III-V semiconductor structure, the slab layer comprising an optically active III-V material.

14. The method of claim 12, wherein the III-V waveguide transition structure further comprises a III-V rib transition segment extending across the first and second sections, wherein:

the III-V rib transition segment decreases in width from a fifth width at the interface of the first exterior edge of the device and the first section and to a sixth width at the interface of the first section and the second section; and the III-V rib transition segment decreases in width from the sixth width at the interface between the first section and the second section to a seventh width at the interface between the second section and the third section.

15. The device of claim 1, wherein the eighth width is 300 nanometers.

16. The method of claim 14, wherein the III-V rib transition segment is formed in a rib layer of the III-V semiconductor structure, the rib layer comprising a p-type III-V material.

17. The method of claim 12, wherein the silicon transition segment formed in the silicon layer extends across the first, second, and third sections, wherein:

the silicon transition segment has a constant width of an eighth width within the first section;

and the silicon transition segment has a constant width of the ninth width within the third section, the eight width being less than the ninth width.

18. The method of claim 12, further comprising:

forming an anode, the anode overlapping the III-V slab transition segment in at least the first section; and forming a cathode adjacent to the III-V slab transition segment.

19. The method of claim 12, wherein the silicon layer has a thickness between 150 nanometers and 350 nanometers.

20. The method of claim 12, further comprising forming a dielectric layer separating the III-V structure from the silicon layer;

wherein the III-V structure comprises an n-type layer between the III-V slab transition segment and the dielectric layer.

* * * * *